United States Patent
Kottilingam et al.

(10) Patent No.: US 10,619,499 B2
(45) Date of Patent: Apr. 14, 2020

(54) COMPONENT AND METHOD FOR FORMING A COMPONENT

(71) Applicant: GENERAL ELECTRIC COMPANY, Schenectady, NY (US)

(72) Inventors: Srikanth Chandrudu Kottilingam, Greenville, SC (US); Brian Lee Tollison, Honea Path, SC (US); Yan Cui, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 265 days.

(21) Appl. No.: 15/412,710

(22) Filed: Jan. 23, 2017

(65) Prior Publication Data
US 2018/0209285 A1   Jul. 26, 2018

(51) Int. Cl.
| | | |
|---|---|---|
| *F01D 9/06* | (2006.01) | |
| *B22D 21/00* | (2006.01) | |
| *B22D 19/00* | (2006.01) | |
| *B22D 17/00* | (2006.01) | |
| *B33Y 10/00* | (2015.01) | |
| *B33Y 80/00* | (2015.01) | |
| *B23K 1/00* | (2006.01) | |

(Continued)

(52) U.S. Cl.
CPC ............ *F01D 9/065* (2013.01); *B22D 17/00* (2013.01); *B22D 19/0072* (2013.01); *B22D 21/005* (2013.01); *B23K 1/0018* (2013.01); *B23K 31/02* (2013.01); *B23P 15/02* (2013.01); *B33Y 10/00* (2014.12); *B33Y 80/00* (2014.12); *F01D 5/186* (2013.01); *F01D 25/005* (2013.01); *B23K 2101/001* (2018.08); *F05D 2220/32* (2013.01); *F05D 2230/237* (2013.01)

(58) Field of Classification Search
CPC ........... F05D 2230/40; F05D 2240/122; F05D 2240/124; F05D 2260/95; B23P 6/045; B23P 15/04; B23P 2700/06
See application file for complete search history.

(56) References Cited

U.S. PATENT DOCUMENTS

| | | | |
|---|---|---|---|
| 4,638,628 A | | 1/1987 | Rice |
| 4,859,141 A | * | 8/1989 | Maisch ................. B23P 11/025 415/115 |

(Continued)

FOREIGN PATENT DOCUMENTS

| | | |
|---|---|---|
| EP | 2230381 A2 | 9/2010 |
| EP | 2679771 A1 | 1/2014 |

OTHER PUBLICATIONS

Extended European Search Report and Opinion issued in connection with corresponding EP Application No. 18151936.4 dated Jun. 6, 2018.

*Primary Examiner* — Dominick L Plakkoottam
(74) *Attorney, Agent, or Firm* — McNees Wallace & Nurick LLC

(57) ABSTRACT

A component including a channel and an insert is provided. The channel is configured to extend through a wall thickness of the component from an inner surface of the component to an outer surface of the component. The channel is defined by an inner channel surface. The insert is configured to permit flow cooling fluid such as air and has an outer insert surface corresponding to and attached to the inner channel surface. The component may be a turbine component. Also provided is a method for forming the component.

20 Claims, 7 Drawing Sheets

(51) Int. Cl.
  *B23K 31/02* (2006.01)
  *B23P 15/02* (2006.01)
  *F01D 25/00* (2006.01)
  *F01D 5/18* (2006.01)
  *B23K 101/00* (2006.01)

(56) References Cited

U.S. PATENT DOCUMENTS

| | | | | |
|---|---|---|---|---|
| 6,158,955 A * | 12/2000 | Caddell, Jr. | ............ | B23K 9/162 |
| | | | | 29/889.1 |
| 6,214,248 B1 * | 4/2001 | Browning | ............... | B23P 15/04 |
| | | | | 216/17 |
| 6,530,971 B1 * | 3/2003 | Cohen | ................ | B23K 35/0244 |
| | | | | 148/24 |
| 7,837,438 B2 * | 11/2010 | Campbell | ................ | F01D 5/146 |
| | | | | 415/191 |
| 8,281,600 B2 * | 10/2012 | Chen | .......................... | F02C 7/18 |
| | | | | 60/772 |
| 9,353,687 B1 * | 5/2016 | Brostmeyer | .............. | F02C 7/16 |
| 9,581,028 B1 * | 2/2017 | Jones | ......... | F01D 5/18 |
| 10,208,602 B2 * | 2/2019 | Thornton | ................ | F01D 5/186 |
| 2003/0165621 A1 * | 9/2003 | Farmer | ................... | B23P 6/002 |
| | | | | 427/331 |
| 2007/0036942 A1 * | 2/2007 | Steele | ..................... | F01D 25/12 |
| | | | | 428/131 |
| 2009/0185903 A1 * | 7/2009 | Beeck | ..................... | F01D 5/145 |
| | | | | 416/91 |
| 2010/0239412 A1 * | 9/2010 | Draper | .................... | F01D 5/186 |
| | | | | 415/115 |
| 2010/0247330 A1 * | 9/2010 | Carchedi | ................ | F01D 5/18 |
| | | | | 416/97 R |
| 2012/0084980 A1 * | 4/2012 | Miglietti | ................ | B23K 35/007 |
| | | | | 29/889.1 |
| 2014/0212628 A1 * | 7/2014 | Lin | ........................ | F01D 5/288 |
| | | | | 428/172 |
| 2015/0362190 A1 * | 12/2015 | Taylor | .................... | F23R 3/002 |
| | | | | 60/752 |
| 2015/0367456 A1 * | 12/2015 | Ozbaysal | .............. | B23K 35/025 |
| | | | | 419/8 |

\* cited by examiner

COMPONENT AND METHOD FOR FORMING A COMPONENT

FIELD OF THE INVENTION

The present invention is generally directed to a cooling component and method of forming a cooling component. More specifically, the present invention is directed to a cooling component including a channel and an insert, and a method of forming a cooling component.

BACKGROUND OF THE INVENTION

To increase both the output and the efficiency, ever increasing turbine inlet temperatures have been used in modern gas turbine power plants. Unfortunately, these higher temperatures have jeopardized the integrity of the turbine components. In order to protect the turbine components from high temperature, both convective cooling and film cooling can be used.

Turbine vane and blade cooling arts disclose various configurations for enhancing film cooling effectiveness and reducing the required amount of cooling air in order to increase the overall efficiency of the engine while obtaining a suitable useful life for the vanes and blades. For example, typical vane and blade airfoils in the high pressure turbine section of the engine include cooling holes that extend through the pressure side, or suction side, or both, for discharging a film of cooling air along the outer surface of the airfoil to effect film cooling in a conventional manner.

Film cooling effectiveness depends on many factors. One such factor is the length of the hole. Film cooling effectiveness is proportional to the length of the hole. However, reduced wall thickness designed to increase the effectiveness of both convective cooling and film cooling, may present a challenge since it limits the length of hole.

BRIEF SUMMARY OF THE INVENTION

In an exemplary embodiment, a component including a channel and an insert is provided. The channel is configured to extend through a wall thickness of the component from an inner surface of the component to an outer surface of the component and is defined by an inner channel surface. The insert is configured to permit flow of cooling fluid and has an outer insert surface corresponding to and attached to the inner channel surface.

In another exemplary embodiment, a turbine component including a channel and an insert is provided. The channel is configured to extend through a wall thickness of the component from an inner surface of the component to an outer surface of the component and is defined by an inner channel surface. The insert is configured to permit flow of cooling fluid and has an outer insert surface corresponding to and attached to the inner channel surface. The insert has a protruded portion protruding from the inner surface of the turbine component.

In another yet exemplary embodiment, a method for forming a component is provided. The method includes a step of forming a channel configured to extend through a wall thickness of the component from an inner surface of the component to an outer surface of the component. The channel is defined by an inner channel surface. The method further includes a step of forming an insert. The method further includes a step of attaching the insert onto the inner channel surface. The insert is configured to permit flow of cooling fluid.

Other features and advantages of the present invention will be apparent from the following more detailed description of the preferred embodiment which illustrates, by way of example, the principles of the invention.

DETAILED DESCRIPTION OF THE INVENTION

Figure 1:
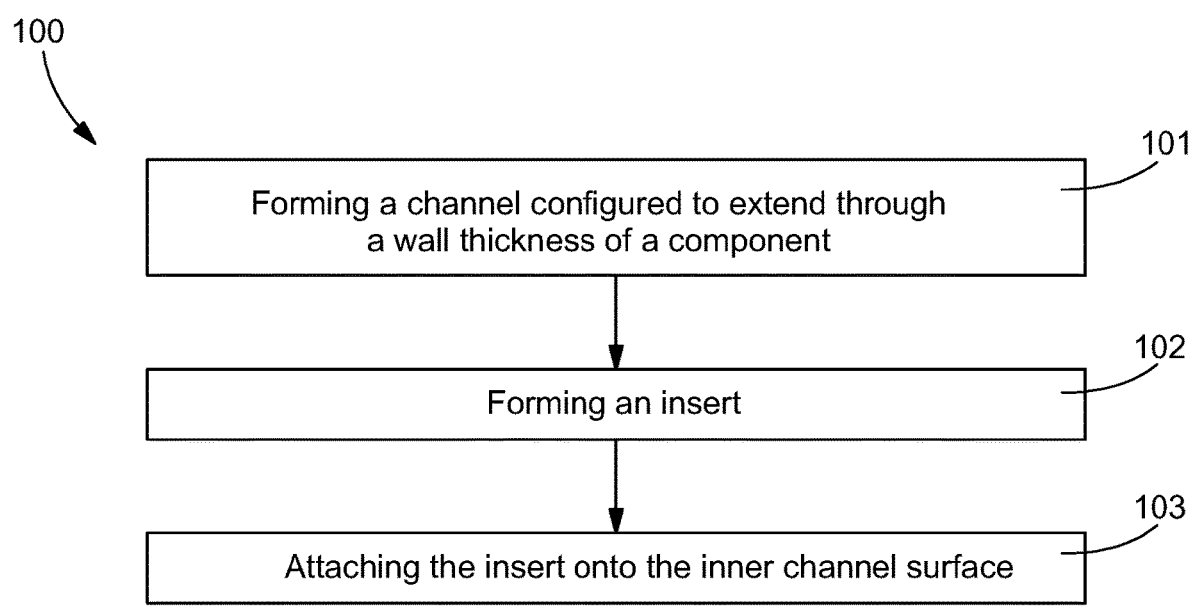
FIG. 1 shows a flow chart of forming a component, according to a method of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Provided are components and an exemplary method of forming a component. Embodiments of the present disclosure, in comparison to components and method not utilizing one or more features disclosed herein, enable use of less cooling air, reduce component weight, reduce low cycle fatigue, and improve component life cycle.

All numbers expressing quantities of ingredients and/or reaction conditions are to be understood as being modified in all instances by the term "about", unless otherwise indicated.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "at least one," as used herein, means one or more and thus includes individual components as well as mixtures/combinations.

The term "comprising" (and its grammatical variations), as used herein, is used in the inclusive sense of "having" or "including" and not in the exclusive sense of "consisting only of."

In accordance with the disclosure, the present invention may comprise a component including a channel and an insert. The component herein illustrated may comprise a metal or an alloy. In some embodiments, the alloy may comprise an HTW alloy. As used herein, the term "HTW alloy" is an alloy that exhibits liquation, hot and strain-age cracking, and which is therefore impractical to weld. In a further embodiment, the HTW alloy is a superalloy. The term "superalloy" is used herein as it is commonly used in the art; i.e., a highly corrosion and oxidation resistant alloy that exhibits excellent mechanical strength and resistance to creep at high temperatures.

In some embodiments, the superalloy may include nickel-based superalloy, cobalt-based superalloy, iron-based superalloy, titanium-based superalloy, or combinations thereof. The superalloy may include, but not be limited to, a material selected from the group consisting of Hastelloy, Inconel alloys, Waspaloy, Rene alloys, such as GTD111, GTD222, GTD444, GTD262, Mar M247, IN100, IN 738, René 80, IN 939, René N2, René N4, René N5, René N6, René 65, René 77 (Udimet 700), René 80, René 88DT, René 104, René 108, René 125, René 142, René 195, René N500, René N515, IN 706, Nimonic 263, CM247, MarM247, CMSX-4, MGA1400, MGA2400, INCONEL 700, INCONEL 738, INCONEL 792, DS Siemet, CMSX10, PWA1480, PWA1483, PWA1484, TMS-75, TMS-82, Mar-M-200, UDIMET 500, ASTROLOY, and combinations thereof.

As used herein, "ASTROLOY" refers to an alloy including a composition, by weight, of about 15% chromium, about 17% cobalt, about 5.3% molybdenum, about 4% aluminum, about 3.5% titanium, and a balance of nickel.

As used herein, "DS Siemet" refers to an alloy including a composition, by weight, of about 9% cobalt, about 12.1% chromium, about 3.6% aluminum, about 4% titanium, about 5.2% tantalum, about 3.7% tungsten, about 1.8% molybdenum, and a balance of nickel.

As used herein, "GTD111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD262" refers to an alloy including a composition, by weight, of about 22.5% chromium, about 19% cobalt, about 2% tungsten, about 1.35% niobium, about 2.3% titanium, about 1.7% aluminum, about 0.1% carbon, and a balance of nickel.

As used herein, "GTD444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "MGA1400" refers to an alloy including a composition, by weight, of about 10% cobalt, about 14% chromium, about 4% aluminum, about 2.7% titanium, about 4.7% tantalum, about 4.3% tungsten, about 1.5% molybdenum, about 0.1% carbon, and a balance of nickel.

As used herein, "MGA2400" refers to an alloy including a composition, by weight, of about 19% cobalt, about 19% chromium, about 1.9% aluminum, about 3.7% titanium, about 1.4% tantalum, about 6% tungsten, about 1% niobium, about 0.1% carbon, and a balance of nickel.

As used herein, "PMA 1480" refers to an alloy including a composition, by weight, of about 10% chromium, about 5% cobalt, about 5% aluminum, about 1.5% titanium, about 12% tantalum, about 4% tungsten, and a balance of nickel.

As used herein, "PWA1483" refers to an alloy including a composition, by weight, of about 9% cobalt, about 12.2% chromium, about 3.6% aluminum, about 4.1% titanium, about 5% tantalum, about 3.8% tungsten, about 1.9% molybdenum, and a balance of nickel.

As used herein, "PMA 1484" refers to an alloy including a composition, by weight, of about 5% chromium, about 10% cobalt, about 2% molybdenum, about 5.6% aluminum, about 9% tantalum, about 6% tungsten, and a balance of nickel.

As used herein, "René N2" refers to an alloy including a composition, by weight, of about 7.5% cobalt, about 13% chromium, about 6.6% aluminum, about 5% tantalum, about 3.8% tungsten, about 1.6% rhenium, about 0.15% hafnium, and a balance of nickel.

As used herein, "René N4" refers to an alloy including a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, and a balance of nickel.

As used herein, "René N5" refers to an alloy including a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, and a balance of nickel.

As used herein, "René N6" refers to an alloy including a composition, by weight, of about 12.5% cobalt, about 4.2% chromium, about 7.2% tantalum, about 5.75% aluminum, about 6% tungsten, about 5.4% rhenium, about 1.4% molybdenum, about 0.15% hafnium, and a balance of nickel.

As used herein, "René 65" refers to an alloy including a composition, by weight, of about 13% cobalt, up to about 1.2% iron, about 16% chromium, about 2.1% aluminum, about 3.75% titanium, about 4% tungsten, about 4% molybdenum, about 0.7% niobium, up to about 0.15% manganese, and a balance of nickel.

As used herein, "René 77 (Udimet 700)" refers to an alloy including a composition, by weight, of about 15% chromium, about 17% cobalt, about 5.3% molybdenum, about 3.35% titanium, about 4.2% aluminum, and a balance of nickel.

As used herein, "René 80" refers to an alloy including a composition, by weight, of about 14% chromium, about 9.5% cobalt, about 4% molybdenum, about 3% aluminum, about 5% titanium, about 4% tungsten, about 0.17% carbon, and a balance of nickel.

As used herein, "René 88DT" refers to an alloy including a composition, by weight, of about 16% chromium, about 13% cobalt, about 4% molybdenum, about 0.7% niobium, about 2.1% aluminum, about 3.7% titanium, about 4% tungsten, about 0.1% rhenium, a maximum of about 4.3% rhenium and tungsten, and a balance of nickel.

As used herein, "René 104" refers to an alloy including a composition, by weight, of about 13.1% chromium, about 18.2% cobalt, about 3.8% molybdenum, about 1.9% tungsten, about 1.4% niobium, about 3.5% aluminum, about 3.5% titanium, about 2.7% tantalum, and a balance of nickel.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René 125" refers to an alloy including a composition, by weight, of about 8.5% chromium, about 10% cobalt, about 4.8% aluminum, up to about 2.5% titanium, about 8% tungsten, up to about 2% molybdenum, about 3.8% tantalum, about 1.4% hafnium, about 0.11% carbon, and a balance of nickel.

As used herein, "René 142" refers to an alloy including a composition, by weight, of about 6.8% chromium, about 12% cobalt, about 6.1% aluminum, about 4.9% tungsten, about 1.5% molybdenum, about 2.8% rhenium, about 6.4% tantalum, about 1.5% hafnium, and a balance of nickel.

As used herein, "René 195" refers to an alloy including a composition, by weight, of about 7.6% chromium, about 3.1% cobalt, about 7.8% aluminum, about 5.5% tantalum, about 0.1% molybdenum, about 3.9% tungsten, about 1.7% rhenium, about 0.15% hafnium, and a balance of nickel.

As used herein, "René N500" refers to an alloy including a composition, by weight, of about 7.5% cobalt, about 0.2% iron, about 6% chromium, about 6.25% aluminum, about 6.5% tantalum, about 6.25% tungsten, about 1.5% molybdenum, about 0.15% hafnium, and a balance of nickel.

As used herein, "René N515" refers to an alloy including a composition, by weight, of about 7.5% cobalt, about 0.2% iron, about 6% chromium, about 6.25% aluminum, about 6.5% tantalum, about 6.25% tungsten, about 2% molybdenum, about 0.1% niobium, about 1.5% rhenium, about 0.6% hafnium, and a balance of nickel.

As used herein, "MarM247" and "CM247" refer to an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel.

As used herein, "IN100" refers to an alloy including a composition, by weight, of about 10% chromium, about 15% cobalt, about 3% molybdenum, about 4.7% titanium, about 5.5% aluminum, about 0.18% carbon, and a balance of nickel.

As used herein, "INCONEL 700" refers to an alloy including a composition, by weight, of up to about 0.12% carbon, about 15% chromium, about 28.5% cobalt, about 3.75% molybdenum, about 2.2% titanium, about 3% aluminum, about 0.7% iron, up to about 0.3% silicon, up to about 0.1% manganese, and a balance of nickel.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "INCONEL 792" refers to an alloy including a composition, by weight, of about 12.4% chromium, about 9% cobalt, about 1.9% molybdenum, about 3.8% tungsten, about 3.9% tantalum, about 3.1% aluminum, about 4.5% titanium, about 0.12% carbon, about 0.1% zirconium, and a balance of nickel.

As used herein, "UDIMET 500" refers to an alloy including a composition, by weight, of about 18.5% chromium, about 18.5% cobalt, about 4% molybdenum, about 3% titanium, about 3% aluminum, and a balance of nickel.

As used herein, "Mar-M-200" refers to an alloy including a composition, by weight, of about 9% chromium, about 10% cobalt, about 12.5% tungsten, about 1% niobium, about 5% aluminum, about 2% titanium, about 10.14% carbon, about 1.8% hafnium, and a balance of nickel.

As used herein, "TMS-75" refers to an alloy including a composition, by weight, of about 3% chromium, about 12% cobalt, about 2% molybdenum, about 6% tungsten, about 6% aluminum, about 6% tantalum, about 5% rhenium, about 0.1% hafnium, and a balance of nickel.

As used herein, "TMS-82" refers to an alloy including a composition, by weight, of about 4.9% chromium, about 7.8% cobalt, about 1.9% molybdenum, about 2.4% rhenium, about 8.7% tungsten, about 5.3% aluminum, about 0.5% titanium, about 6% tantalum, about 0.1% hafnium, and a balance of nickel.

As used herein, "CMSX-4" refers to an alloy including a composition, by weight, of about 6.4% chromium, about 9.6% cobalt, about 0.6% molybdenum, about 6.4% tungsten, about 5.6% aluminum, about 1.0% titanium, about 6.5% tantalum, about 3% rhenium, about 0.1% hafnium, and a balance of nickel.

As used herein, "CMSX-10" refers to an alloy including a composition, by weight, of about 2% chromium, about 3% cobalt, about 0.4% molybdenum, about 5% tungsten, about 5.7% aluminum, about 0.2% titanium, about 8% tantalum, about 6% rhenium, and a balance of nickel.

Any of the alloy compositions described herein may include incidental impurities.

With reference to FIG. 1, a flow chart illustrating a method for forming a component is provided. The method for forming a component includes forming a channel configured to extend through a wall thickness of the component from an inner surface of the component to an outer surface of the component (step 101). The channel is defined by an inner channel surface. The method further includes forming an insert (step 102). The method further includes a step of attaching the insert onto the inner channel surface. The insert is configured to permit flow of cooling fluid such as air (step 103).

When the insert 304 is attached on the inner channel surface 302 (see for example FIG. 3), the attached insert provides extra length of the hole to increase film cooling effectiveness. The cooling fluid flows for convective cooling through the internal cooling passages and is subsequently deflected to external film cooling through film cooling holes onto the surface of turbine components. This method according to the present disclosure can be utilized to enable effective film cooling in sections having a reduced wall thickness in new parts or existing parts. This method according to the present disclosure can also enable use of less cooling air, reduce component weight, reduce low cycle fatigue, and improve component life cycle.

In certain embodiments, the forming step 102 may include, but not be limited to 3D printing, metal injection molding (MIM), casting, advanced machining methods, or combinations thereof.

In certain embodiments, the attaching step 103 may include, but not be limited to, brazing, welding, mechanical fit or combinations thereof.

Figure 2:
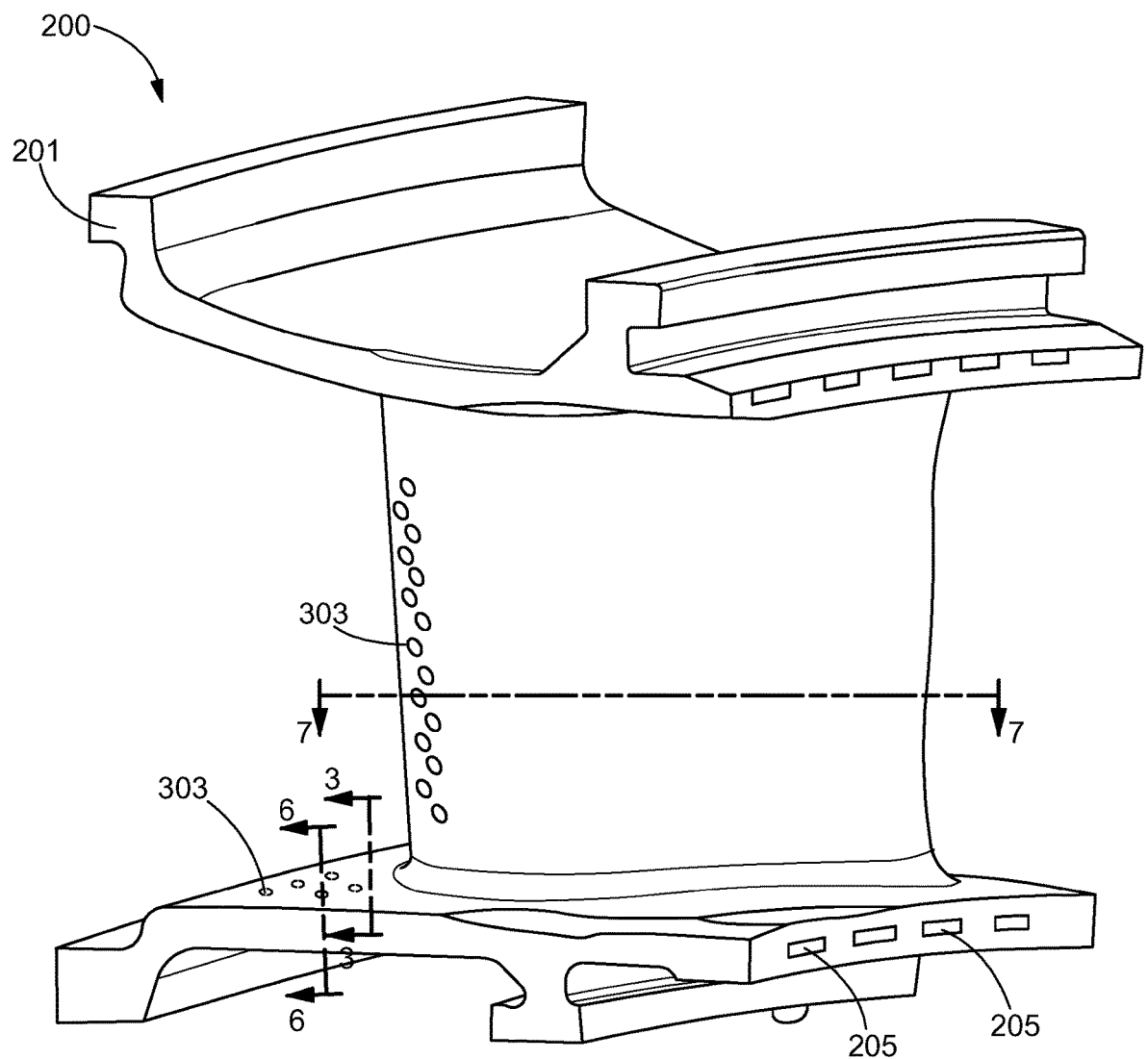
FIG. 2 shows a perspective view of a turbine nozzle casting according to an embodiment of the present disclosure.

With reference to FIG. 2, a coated article 200 may be a turbine component 201. The turbine component 201 may be selected from the group consisting of at least one of hot gas path components, combustion components, blades (buckets), vanes (nozzles), shrouds, combustor liners, transition ducts, cross fire tube collars, venturis, transition piece seals, and fuel nozzle parts. The turbine component 202 may include at least one plenum 205 as shown. The plenums are internally connected to cooling holes 303. Cooling fluid flows from the plenums 205 through a passageway defined in an airfoil of the turbine component 202 and discharges through the cooling holes 303.

Figure 3:
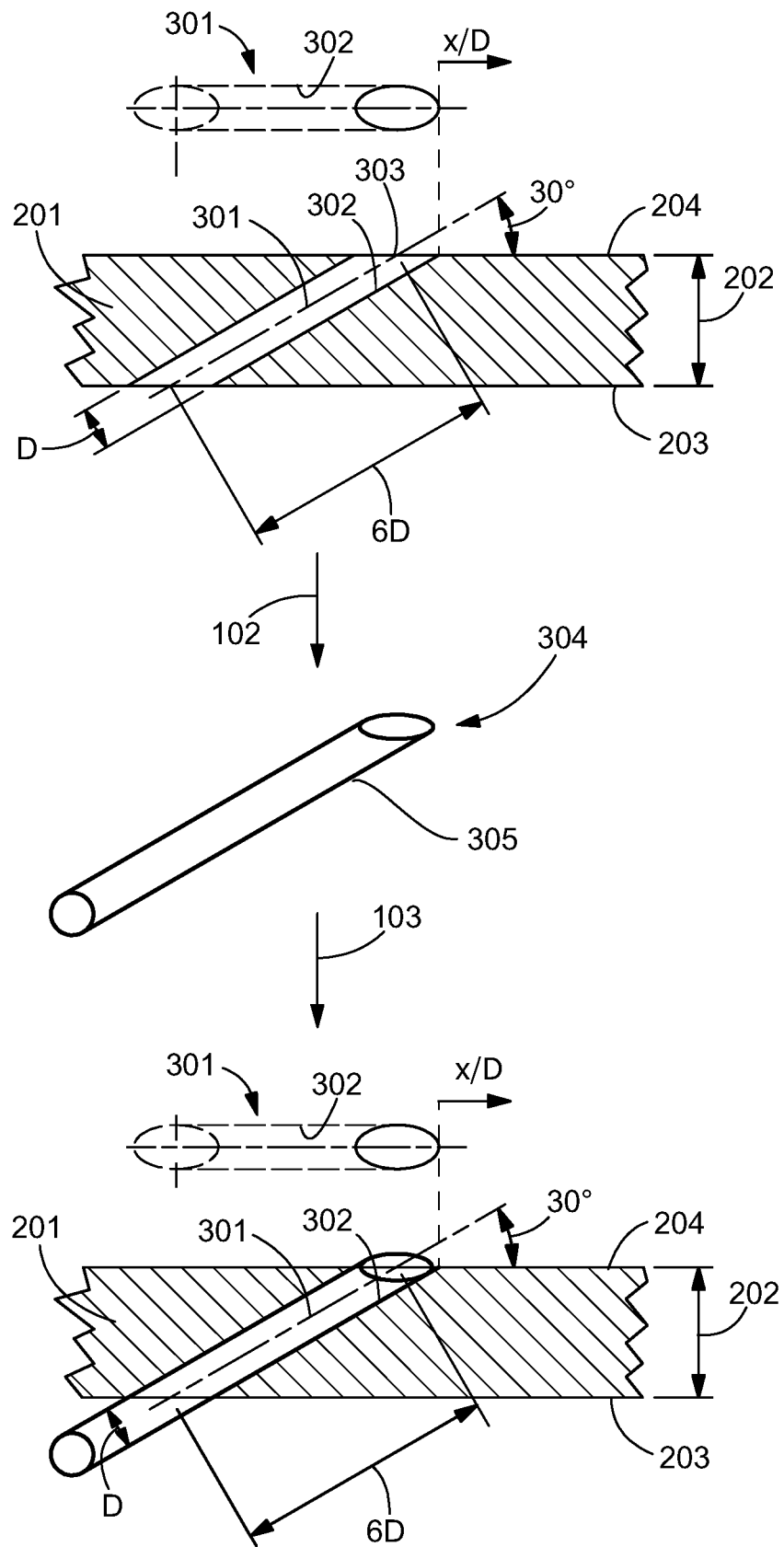
FIG. 3 schematically illustrates a method for forming a component with an insert configured to a cylindrical channel, according to an embodiment of the present disclosure.

With reference to FIG. 3, a component 201 including a channel 301 having a cylindrical geometry also expanded above in a top view, and an insert 304 is provided. The channel 301 is configured to extend through a wall thickness 202 of the component 201 from an inner surface 203 of the component to an outer surface 204 of the component 201 and is defined by an inner channel surface 302 (step 101). The insert 304 is configured to permit flow of cooling fluid such as air and has an outer insert surface 305 corresponding to and attached to the inner channel surface 302 (step 102). In certain embodiments, the insert 304 may be attached to the inner channel surface 302 by a braze, weld, or combinations thereof (step 103). The insert 208 may include a combination of a superalloy powder and a braze matrix, wherein the superalloy powder has a higher melting temperature than the braze matrix.

Figure 4:
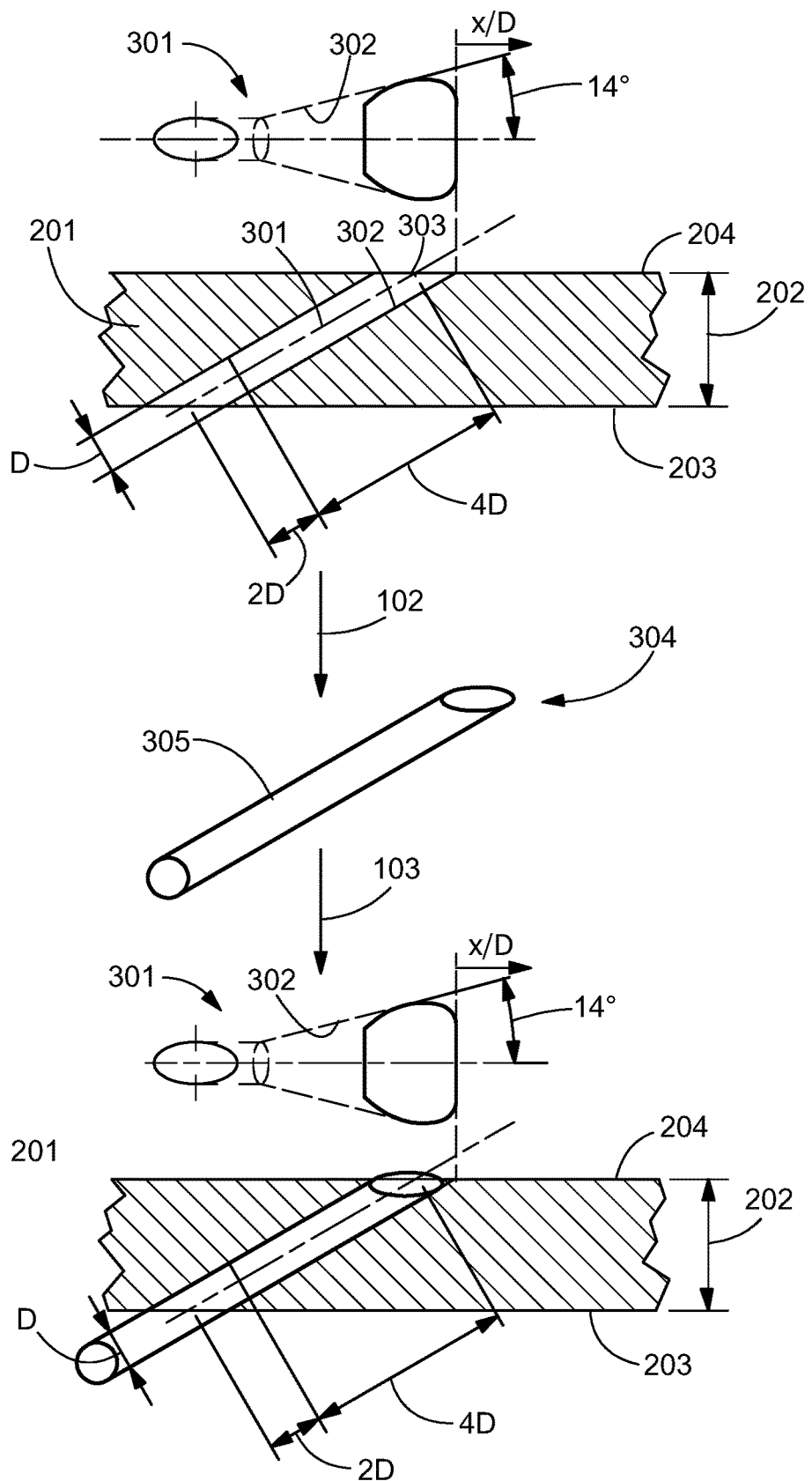
FIG. 4 schematically illustrates a method for forming a component with an insert configured to a fan-shaped channel, according to an embodiment of the present disclosure.

With reference to FIG. 4, a component 201 including a channel 301, having a fan-shaped geometry, also expanded above in a top view, and an insert 304 is provided. The channel 301 is configured to extend through a wall thickness 202 of the component 201 from an inner surface 203 of the component to an outer surface 204 of the component 201 and is defined by an inner channel surface 302 (step 101). The insert 304 is configured to permit flow of cooling fluid such as air and has an outer insert surface 305 corresponding to and attached to the inner channel surface 302 (step 102). In certain embodiments, the insert 304 may be attached to the inner channel surface 302 by a braze, weld, or combinations thereof (step 103). The insert 304 may include a combination of a superalloy powder and a braze matrix, wherein the superalloy powder has a higher melting temperature than the braze matrix.

Figure 5:
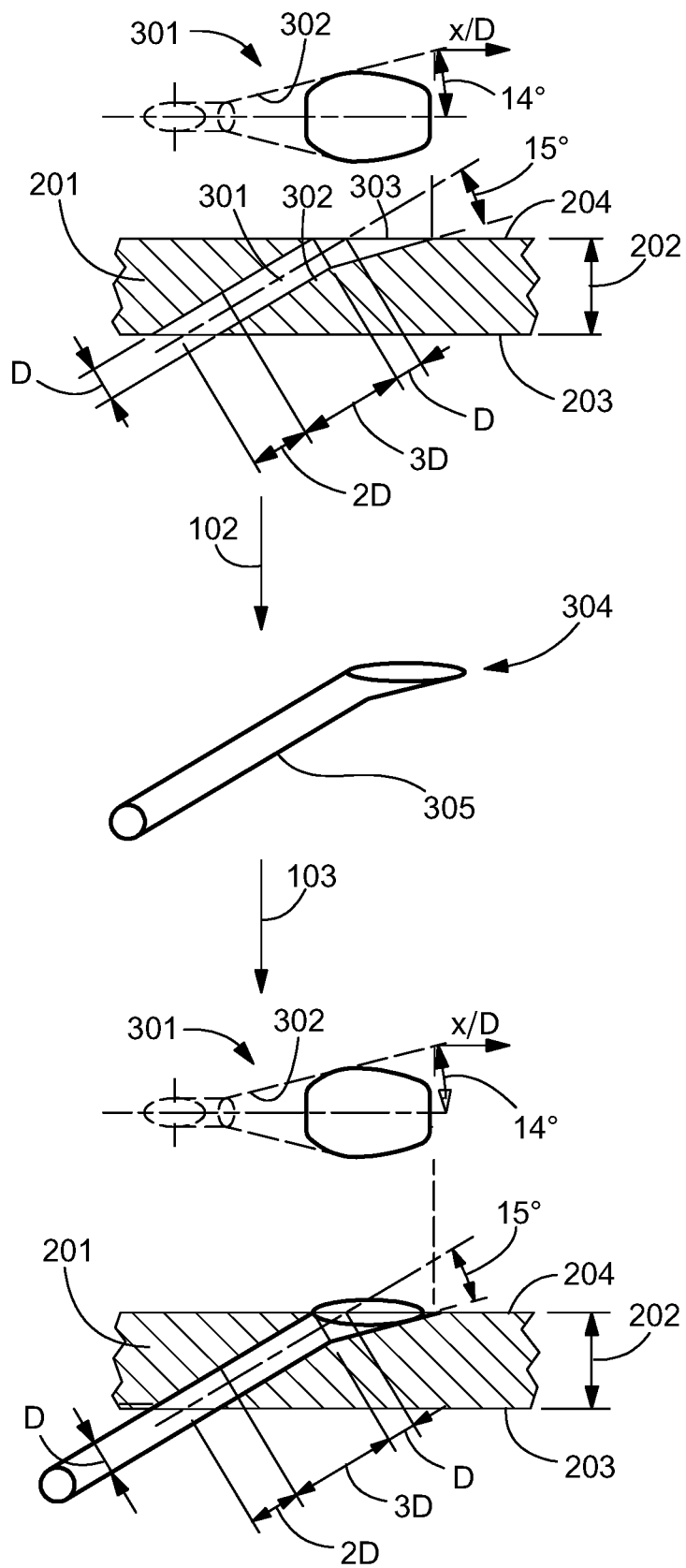
FIG. 5 schematically illustrates a method for forming a component with an insert configured to a laidback fan-shaped channel, according to an embodiment of the present disclosure.

With reference to FIG. 5, a component 201 including a channel 301, having a laidback fan-shaped geometry, also expanded above in a top view, and an insert 304 is provided. The channel 301 is configured to extend through a wall thickness 202 of the component 201 from an inner surface 203 of the component to an outer surface 204 of the component 201 and is defined by an inner channel surface 302 (step 101). The insert 304 is configured to permit flow of cooling fluid such as air and has an outer insert surface 305 corresponding to and attached to the inner channel surface 302 (step 102). In certain embodiments, the insert 304 may be attached to the inner channel surface 302 by a braze, weld, or combinations thereof (step 103). The insert 304 may include a combination of a superalloy powder and a braze matrix, wherein the superalloy powder has a higher melting temperature than the braze matrix.

In certain embodiments, a turbine component including a channel 301 and an insert 304 is provided. Channel 301 is configured to extend through a wall thickness of the component from an inner surface 203 of the component to an outer surface 204 of the component and is defined by an inner channel surface 302. The insert is configured to permit flow of cooling fluid such as air and has an outer insert surface 305 corresponding to and attached to the inner channel surface 302. The insert has a protruded portion 306 protruding from the inner surface of the turbine component.

In certain embodiments, insert 304 may protrude from the inner surface 203 of the component. In certain embodiments, insert 304 may protrude from the outer surface 204 of the component. In yet other embodiments, insert 304 may protrude from both the inner surface 203 and outer surface 204 of the component. In some embodiments, insert 304 can have a protruded portion from the inner surface and/or outer surface from 0.010 inch to 0.080 inch.

In certain embodiments, turbine component 201 may include blades (buckets), vanes (nozzles), shrouds, combustors, transition ducts, and combinations thereof.

Figure 6:
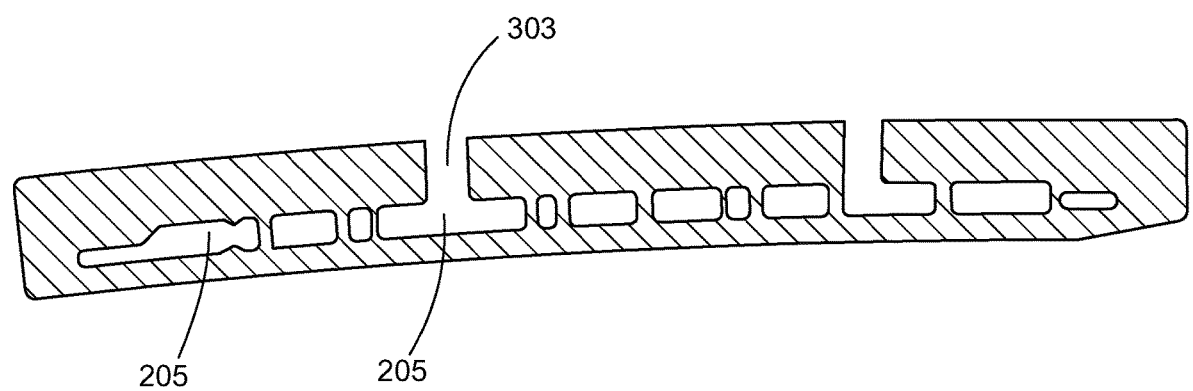
FIG. 6 shows a sectional view, taken along the line 6-6 in FIG. 2, looking in the direction of arrows applied thereto.

With reference to FIG. 6, a part of a turbine component 201 including plenums 205 shows a sectional view, taken along the line 6-6 in FIG. 2. The plenums 205 are internally and fluidly connected to cooling holes 303. An insert 304 can be attached to the cooling holes 303, thereby providing extra length of the hole to increase film cooling effectiveness. This is especially effective when the wall thickness of the casting between the plenums 205 and the hot gas path surface is insufficient. The insert 304 can have a geometry selected from the group consisting of a cylindrical geometry, a fan-shaped geometry, a laidback fan-shaped geometry, and combinations thereof, depending on the geometry of the channel.

Figure 7:
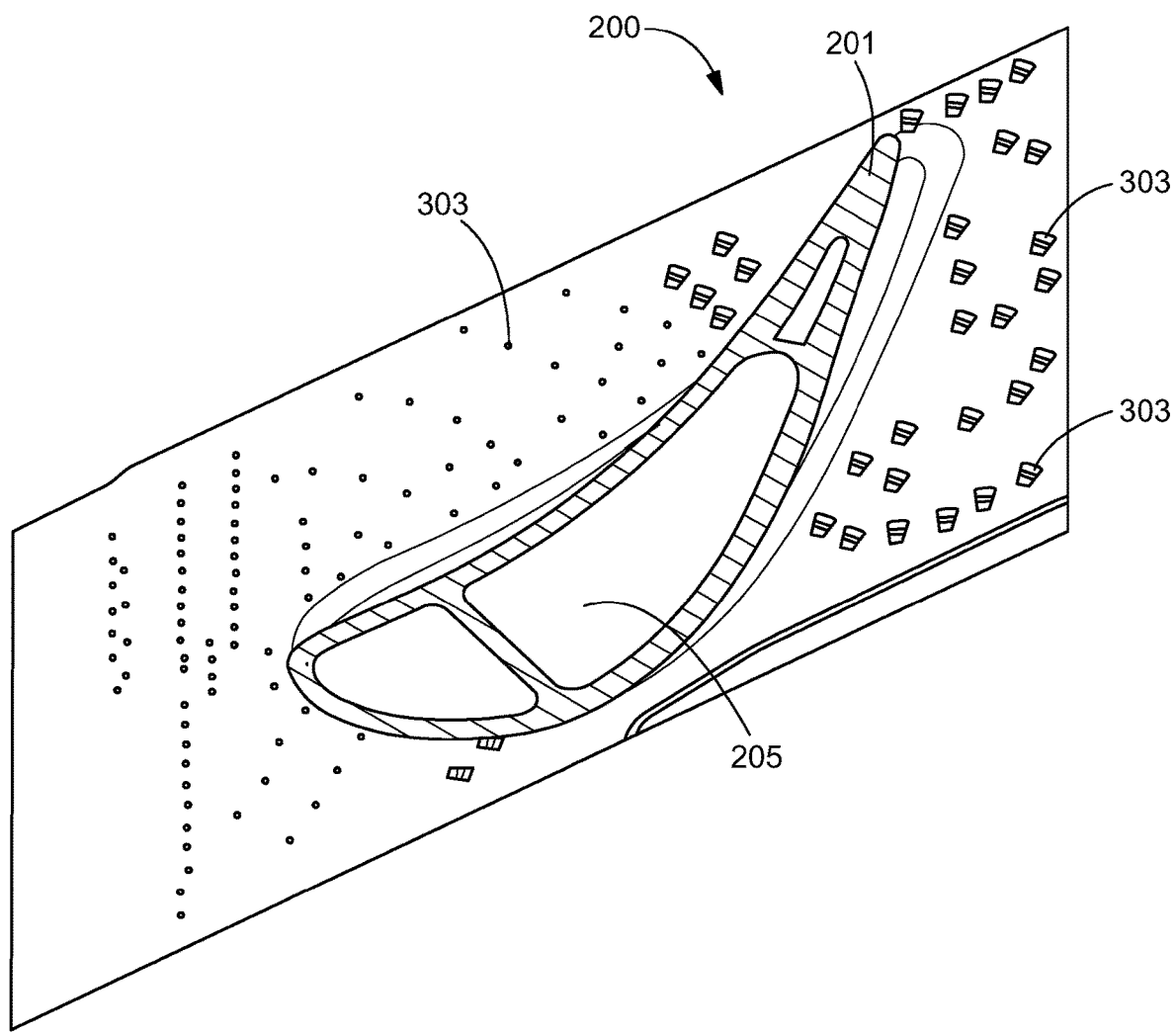
FIG. 7 shows a sectional view, taken along the line 7-7 in FIG. 2, looking in the direction of arrows applied thereto.

With reference to FIG. 7, a coated article 200 including a turbine component 201 shows a sectional view, taken along the line 7-7 in FIG. 2. The coated article 200 includes cooling holes 303. An insert 304 can be attached to the cooling holes 303, thereby providing extra length of the hole to increase film cooling effectiveness. The insert 304 can have a geometry selected from the group consisting of a cylindrical geometry, a fan-shaped geometry, a laidback fan-shaped geometry, and combinations thereof, depending on the geometry of the channel.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A component comprising:
   a channel configured to extend through a wall thickness of the component from an inner surface of the component to an outer surface of the component, the channel being defined by an inner channel surface; and
   an insert configured to permit flow of film cooling fluid to the outer surface of the component, the insert having an outer insert surface corresponding to and attached to the inner channel surface,
   wherein the outer insert surface protrudes from the inner surface of the component beyond an immediately adjacent boundary of the inner surface about an entire circumference of the insert disposed at the inner surface of the component, extending a length of the channel exterior of the wall thickness of the component.

2. The component according to claim 1, wherein the insert is manufactured by a process selected from the group consisting of 3D printing, metal injection molding, casting, advanced machining methods and combinations thereof.

3. The component according to claim 1, wherein the insert comprises a combination of a superalloy powder and a braze matrix, wherein the superalloy powder has a higher melting temperature than the braze matrix.

4. The component according to claim 1, wherein the channel comprises a geometry selected from the group consisting of a cylindrical geometry, a fan-shaped geometry, a laidback fan-shaped geometry, and combinations thereof.

5. The component according to claim 1, wherein the insert is attached to the inner channel surface by a braze, weld, or combinations thereof.

6. The component according to claim 1, wherein the component comprises a material selected from the group consisting of metal, alloy, and combinations thereof.

7. The component according to claim 6, wherein the component comprises a hard-to-weld (HTW) alloy material selected from the group consisting of superalloy, nickel-based superalloy, cobalt-based superalloy, iron-based superalloy, titanium-based superalloy and combinations thereof.

8. The component according to claim 4, wherein the channel comprises a geometry selected from the group consisting of a fan-shaped geometry, a laidback fan-shaped geometry, and combinations thereof.

9. The component according to claim 1, wherein the component includes increased film cooling relative to a comparative component which is otherwise identical to the component except that the outer insert surface of the comparative component does not protrude from the inner surface of the comparative component beyond an immediately adjacent boundary of the inner surface about an entire circumference of the insert disposed at the inner surface of the comparative component.

10. A turbine component comprising:
a channel configured to extend through a wall thickness of the turbine component from an inner surface of the turbine component to an outer surface of the turbine component, the channel being defined by an inner channel surface; and
an insert configured to permit flow of film cooling fluid to the outer surface of the turbine component, the insert having an outer insert surface corresponding to and attached to the inner channel surface,
wherein the insert has a protruded portion protruding from the inner surface of the turbine component, the outer insert surface of the protruded portion of the insert protruding beyond an immediately adjacent boundary of the inner surface about an entire circumference of the insert disposed at the inner surface of the turbine component, extending a length of the channel exterior of the wall thickness of the turbine component.

11. The turbine component according to claim 10, wherein the outer insert surface is welded or brazed onto the inner channel surface.

12. The turbine component according to claim 10, wherein the component comprises a material selected from the group consisting of metal, alloy, and combinations thereof.

13. The turbine component according to claim 12, wherein the turbine component comprises a hard-to-weld (HTW) alloy material selected from the group consisting of superalloy, nickel-based superalloy, cobalt-based superalloy, iron-based superalloy, titanium-based superalloy and combinations thereof.

14. A method for forming a component comprising the steps of:
forming a channel configured to extend through a wall thickness of the component from an inner surface of the component to an outer surface of the component, the channel being defined by an inner channel surface;
forming an insert; and
attaching the insert onto the inner channel surface, the insert being configured to permit flow of film cooling fluid to the outer surface of the component,
wherein an outer insert surface of the insert protrudes from the inner surface of the component beyond an immediately adjacent boundary of the inner surface about an entire circumference of the insert disposed at the inner surface of the component, extending a length of the channel exterior of the wall thickness of the component.

15. The method according to claim 14, the component is a turbine component.

16. The method according to claim 14, wherein the insert is formed by a process selected from the group consisting of 3D printing, metal injection molding, casting, advanced machining methods and combinations thereof.

17. The method according to claim 14, wherein the insert is a combination of a superalloy powder and a braze matrix, wherein the superalloy powder has a higher melting temperature than braze matrix.

18. The method according to claim 14, wherein the attaching is performed by a process selected from the group consisting of brazing, welding, mechanical fit and combinations thereof.

19. The method according to claim 14, wherein the channel comprises a geometry selected from the group consisting of a cylindrical geometry, a fan-shaped geometry, a laidback fan-shaped geometry, and combinations thereof.

20. The method according to claim 14, wherein the component comprises a hard-to-weld (HTW) alloy material selected from the group consisting of superalloy, nickel-based superalloy, cobalt-based superalloy, iron-based superalloy, titanium-based superalloy and combinations thereof.

* * * * *